United States Patent
Kern et al.

(10) Patent No.: US 10,171,336 B2
(45) Date of Patent: Jan. 1, 2019

(54) OPENFLOW CONFIGURED HORIZONTALLY SPLIT HYBRID SDN NODES

(71) Applicant: Telefonaktiebolaget LM Ericsson (publ), Stockholm (SE)

(72) Inventors: Andras Kern, Budapest (HU); Balazs Peter Gero, Budapest (HU); Balazs Varga, Budapest (HU); Zoltan Richard Turanyi, Szentendre (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 153 days.

(21) Appl. No.: 14/971,908

(22) Filed: Dec. 16, 2015

(65) Prior Publication Data
US 2017/0180240 A1    Jun. 22, 2017

(51) Int. Cl.
| H04L 12/751 | (2013.01) |
| H04L 12/741 | (2013.01) |
| H04L 12/749 | (2013.01) |
| H04L 12/947 | (2013.01) |
| H04L 12/24  | (2006.01) |

(52) U.S. Cl.
CPC .............. *H04L 45/02* (2013.01); *H04L 41/12* (2013.01); *H04L 45/54* (2013.01); *H04L 45/741* (2013.01); *H04L 49/25* (2013.01)

(58) Field of Classification Search
CPC ...................................................... H04L 45/02
See application file for complete search history.

(56) References Cited

U.S. PATENT DOCUMENTS

| 7,990,993 B1* | 8/2011 | Ghosh ................... H04L 45/025 370/428 |
| 8,411,688 B2* | 4/2013 | Farkas ................ H04L 12/4645 370/225 |
| 8,560,663 B2* | 10/2013 | Baucke ................... H04L 45/50 370/255 |
| 8,797,877 B1* | 8/2014 | Perla ....................... H04L 49/00 370/230 |

(Continued)

OTHER PUBLICATIONS

OpenFlow Networking Foundation, "OF-CONFIG 1.2 OpenFlow Management and Configuration Protocol," https://www.opennetworking.org/images/stories/downloads/sdn-resources/onf-specifications/openflow-config/of-config-1.2.pdf, ONF-TS-016, 2014, 44 pages.

(Continued)

*Primary Examiner* — Parth Patel
(74) *Attorney, Agent, or Firm* — NDWE, LLP

(57) ABSTRACT

A method is provided by a network element to execute a forwarding information base (FIB) manager to program a packet forwarding function of the network element. The FIB manager supports a hybrid control plane with software defined networking (SDN) and local control plane processes. The method includes receiving a request to configure a node reachability configuration element, where the node reachability element describes packet processing instruction for the packet forwarding function to forward packets toward a referred node, selecting a flow control agent to be updated for reachability to the referred node, and updating a logical forwarding information representation to encode a next hop identifier for the referred node.

20 Claims, 8 Drawing Sheets

(56) References Cited

U.S. PATENT DOCUMENTS

| | | | | |
|---|---|---|---|---|
| 9,032,093 | B2* | 5/2015 | Bhatt | H04L 45/245 709/238 |
| 9,071,529 | B2* | 6/2015 | Garg | H04L 45/38 |
| 9,503,344 | B2* | 11/2016 | Chakrabarti | H04L 43/0852 |
| 9,686,381 | B1* | 6/2017 | Singh | H04L 69/22 |
| 9,769,074 | B2* | 9/2017 | DeCusatis | H04L 47/12 |
| 2004/0133619 | A1* | 7/2004 | Zelig | H04L 12/4641 709/200 |
| 2012/0257623 | A1* | 10/2012 | Huang | H04L 12/56 370/390 |
| 2012/0275338 | A1* | 11/2012 | Filsfils | H04L 12/4625 370/254 |
| 2013/0266019 | A1* | 10/2013 | Qu | H04L 45/74 370/395.53 |
| 2015/0023358 | A1* | 1/2015 | Tsirkin | H04L 41/0816 370/401 |
| 2015/0110116 | A1* | 4/2015 | Gong | H04L 67/1097 370/392 |
| 2015/0120924 | A1* | 4/2015 | Scott | H04L 69/22 709/225 |
| 2015/0124805 | A1* | 5/2015 | Yadav | H04L 47/50 370/389 |
| 2015/0319089 | A1* | 11/2015 | Liu | H04L 45/745 370/392 |
| 2015/0381428 | A1* | 12/2015 | Ong | H04L 41/12 709/223 |
| 2016/0057054 | A1* | 2/2016 | Lumezanu | H04L 45/48 370/256 |
| 2016/0057219 | A1* | 2/2016 | Kore | H04L 67/28 709/248 |
| 2016/0080263 | A1* | 3/2016 | Park | G06F 17/30345 370/392 |
| 2016/0197831 | A1* | 7/2016 | De Foy | H04L 45/7453 370/392 |
| 2016/0241459 | A1* | 8/2016 | Zheng | H04L 45/38 |
| 2016/0254984 | A1* | 9/2016 | Tekalp | H04L 45/02 709/242 |
| 2016/0352538 | A1* | 12/2016 | Chiu | H04L 12/6418 |
| 2017/0078183 | A1* | 3/2017 | Civanlar | H04L 45/02 |
| 2017/0099354 | A1* | 4/2017 | Moynihan | H04L 67/141 |
| 2017/0180225 | A1* | 6/2017 | Sampath | H04L 49/604 |

OTHER PUBLICATIONS

OpenFlow Networking Foundation, "OpenFlow Switch Specification Version 1.5.1" (Protocol version 0x06), https://www.opennetworking.org/images/stories/downloads/sdn-resources/onf-specifications/openflow/openflow-switch-v1.5.1.pdf, Mar. 26, 2015, 283 pages.

Hampel, et al., "Applying Software-Defined Networking to the Telecom Domain," 16th IEEE Global Internet Symposium, Apr. 14-19, 2013, 6 pages.

Rune, et al., "Architecture evolution for automation and network programmability," Ericsson Review, http://www.ericsson.com/res/thecompany/docs/publications/ericsson_review/2014/er-evolved-network-architecture.pdf, Nov. 28, 2014, 11 pages.

Varga, et al., Hybrid-SDN for Packet Transport: The Horizontal Split, IEEE, ICTON 2015, Jul. 5-9, 2015, 4 pages.

Atlas A., et al., "An Architecture for the Interface to the Routing System draft-ietf-i2rs-architecture-10," IETF, Internet Society, Nov. 30, 2015, pp. 1-32.

\* cited by examiner

FIG. 7A
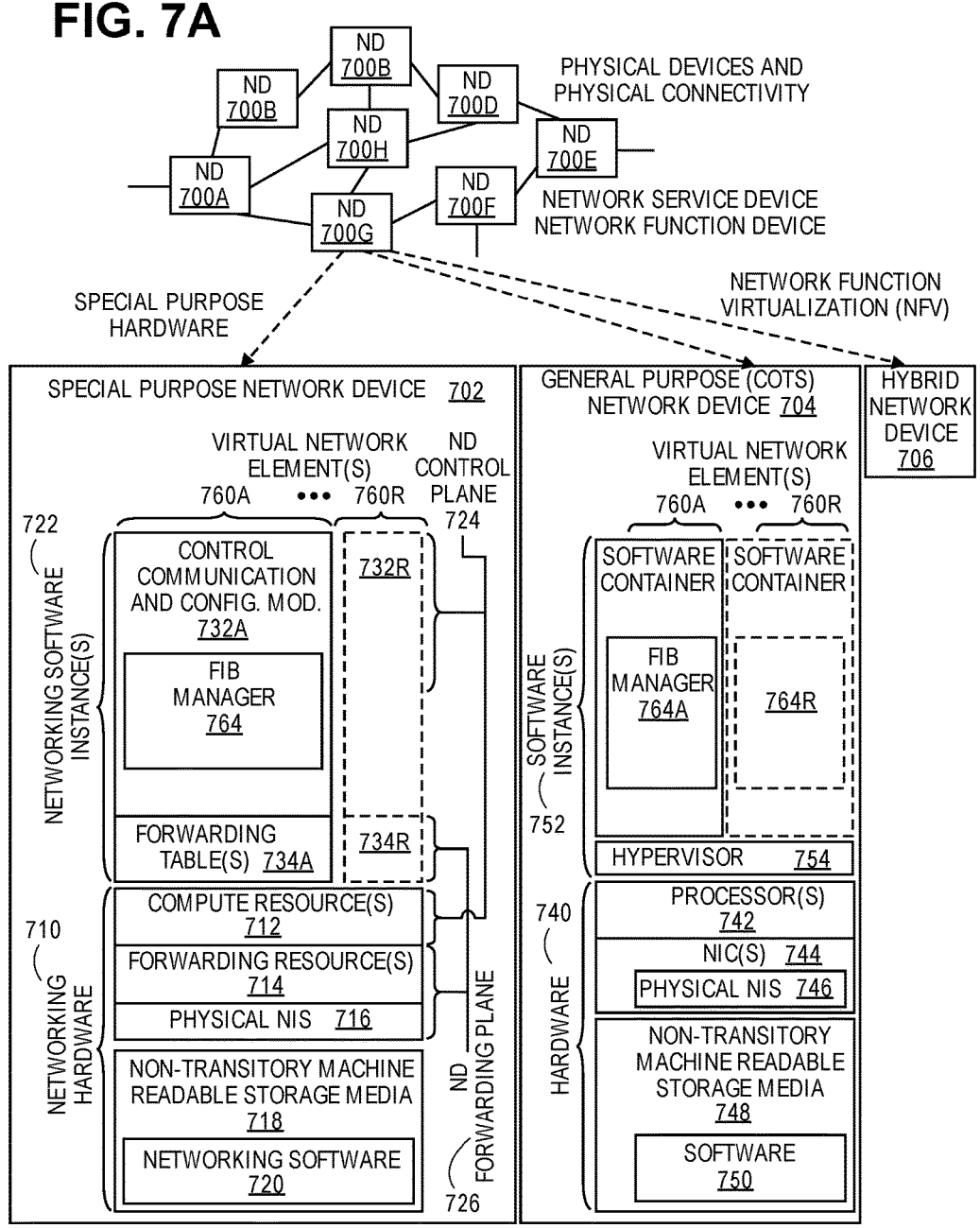
FIG. 7B

OPENFLOW CONFIGURED HORIZONTALLY SPLIT HYBRID SDN NODES

FIELD

Embodiments of the invention relate to the field of software defined networking (SDN) and control plane process implementation in network elements. Specifically, the embodiments relate to a process for using a flow control protocol as a configuration protocol between hybrid SDN nodes and a service controller.

BACKGROUND

A hybrid SDN architecture applies SDN-based control capabilities onto the existing transport infrastructure utilizing a distributed control plane instead of a centralized control plane as is utilized in a standard SDN architecture. One example of a hybrid SDN architecture, referred to as horizontal split, is when the service related functions are provisioned by the central SDN controller while the simpler transport functions (e.g., maintaining connectivity between the nodes of the network domain) are implemented using legacy, distributed methods.

FIG. 1 is a diagram of one embodiment of a basic embodiment of a hybrid SDN implementation. The hybrid SDN includes a service controller that provides a set of services to each of the hybrid SDN node in the hybrid SDN architecture. The hybrid SDN nodes utilize distributed transport protocols for inter-communication and routing between the hybrid SDN nodes using interior gateway protocol (IGP) or similar distributed protocol. The service controller communicates with each of the hybrid SDN nodes using a flow control protocol.

The flow control protocol, such as OpenFlow or similar flow control protocol, specifies a protocol for configuring and managing the FIB of a data plane node. A flow control compliant data plan implements a logical view of its FIB, referred to as the logical switch. All configuration actions are performed on this logical view, i.e., on the logical switch. The node then transforms the configuration information elements of the logical switch into actual FIB entries. The configuration information elements represent the forwarding information of the logical switch. Some specific implementations specify a protocol for configuring a managing logical switch instances, such as OpenFlow Configuration (OF-CONFIG). The different logical switch instances of the same node can be driven and configured by different controllers via this protocol.

However, the concepts related to hybrid SDN implementation that have been proposed have significant limitations in their implementations. In particular, the coherence of their proposed implementation is not assured or well defined. Thus, significant difficulties remain to implementing a hybrid SDN architecture.

SUMMARY

In one embodiment, a method for implementing network element to execute a forwarding information base (FIB) manager to program a packet forwarding function of the network element is provided. The FIB manager supports a hybrid control plane with software defined networking (SDN) and local control plane processes. The method includes receiving a request to configure a node reachability configuration element, where the node reachability element describes packet processing instruction for the packet forwarding function to forward packets toward a referred node, selecting a flow control agent to be updated for reachability to the referred node, and updating a logical forwarding information representation to encode a next hop identifier for the referred node.

In another embodiment, a network element is configured to execute a forwarding information base (FIB) manager to program a packet forwarding function of the network element, where the FIB manager supports a hybrid control plane with software defined networking (SDN) and local control plane processes. The network element includes a non-transitory machine readable medium having stored therein the FIB manager, and a processor coupled to the non-transitory machine readable medium, the processor configured to execute the FIB manager, the FIB manager configured to receive a request to configure a node reachability configuration element, where the node reachability element describes packet processing instruction for the packet forwarding function to forward packets toward a referred node, to select a flow control agent to be updated for reachability to the referred node, and to update a logical forwarding information representation to encode next hop identifier for the referred node.

In a further embodiment, a computing device configured to execute a plurality of virtual machines for implementing network function virtualization (NFV), wherein a virtual machine from the plurality of virtual machines for is configured to execute a forwarding information base (FIB) manager to program a packet forwarding function of the network element, where the FIB manager supports a hybrid control plane with software defined networking (SDN) and local control plane processes. The computing device includes a non-transitory machine readable medium having stored therein the FIB manager, and a processor coupled to the non-transitory machine readable medium, the processor configured to execute the virtual machine, the virtual machine configured to execute the FIB manager, the FIB manager configured to receive a request to configure a node reachability configuration element, where the node reachability element describes packet processing instruction for the packet forwarding function to forward packets toward a referred node, to select a flow control agent to be updated for reachability to the referred node, and to update a logical forwarding information representation to encode next hop identifier for the referred node.

BRIEF DESCRIPTION OF THE DRAWINGS

The invention may best be understood by referring to the following description and accompanying drawings that are used to illustrate embodiments of the invention. In the drawings:

FIG. 7A illustrates connectivity between network devices (NDs) within an exemplary network, as well as three exemplary implementations of the NDs, according to some embodiments of the invention.

FIG. 7B illustrates an exemplary way to implement a special-purpose network device according to some embodiments of the invention.

DESCRIPTION OF EMBODIMENTS

Figure 1:
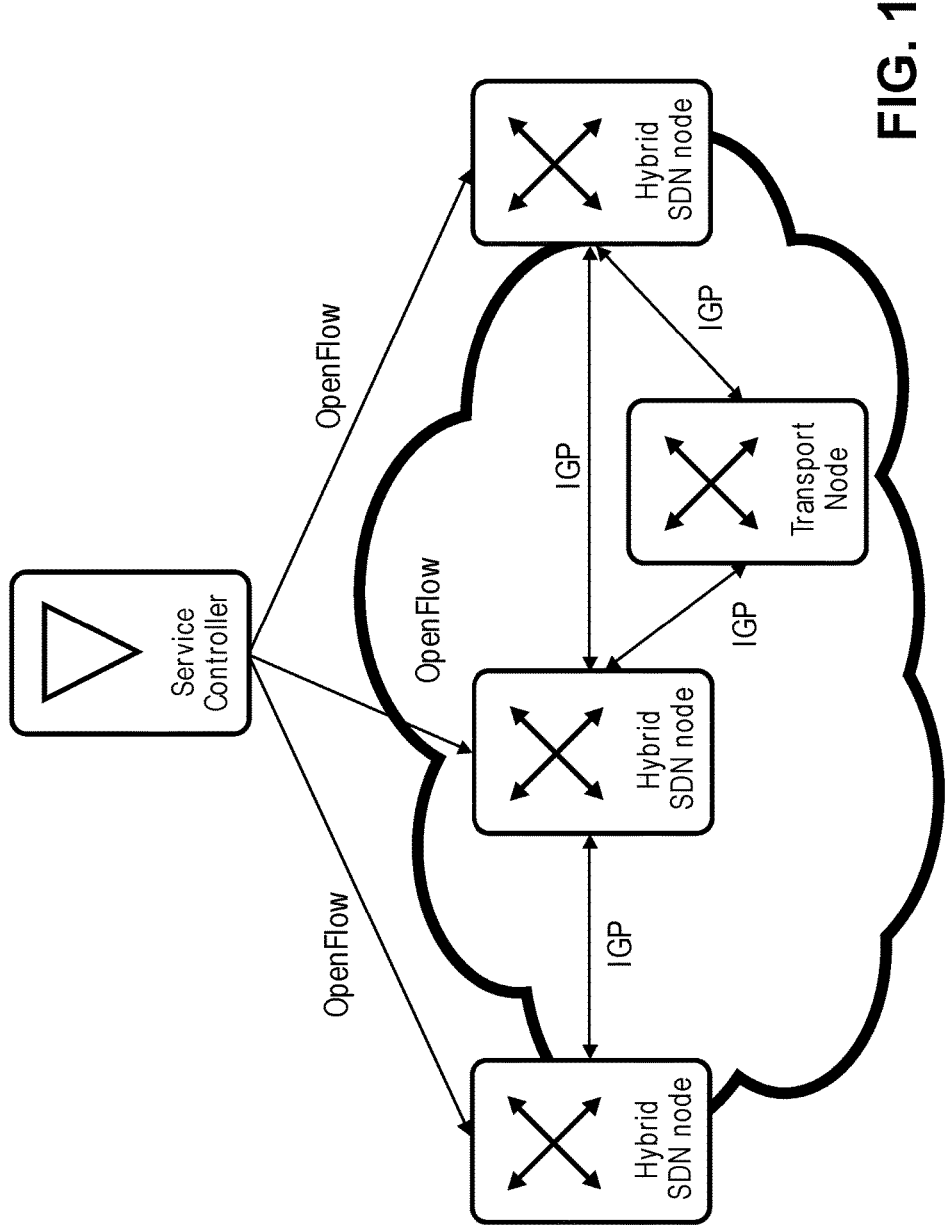
FIG. 1 is a diagram of one embodiment of a basic embodiment of a hybrid SDN implementation.

The following description describes methods and apparatus for implementing a hybrid software defined networking (SDN) network. The hybrid SDN network is configured to enable configuration of the hybrid SDN nodes via a flow control protocol such as the OpenFlow protocol. At the same time, the hybrid SDN nodes support conventional distributed control plane processes such as interior gateway protocol (IGP) and similar protocols. A forwarding information base (FIB) manager interfaces with the service controller of the SDN and the local control processes to maintain and update the FIB such that a coherent and consistent FIB is maintained based on both the local control plane processes and the configuration of the service controller. The processes for updating the FIB are efficient and avoid creating scenarios where either the service controller or the control plane processes adversely affect one another.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Overview

Figure 2:
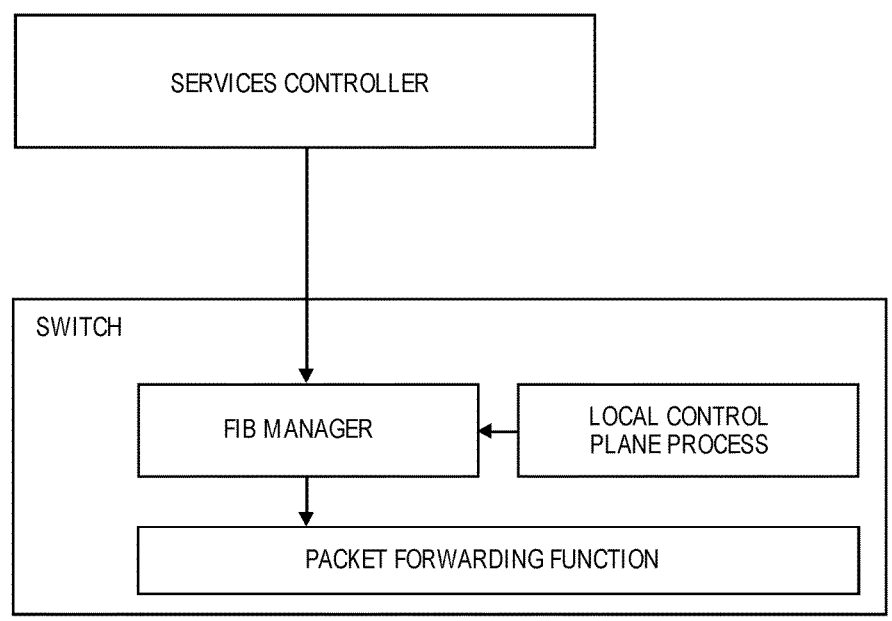
FIG. 2 is a diagram of on embodiment of a hybrid software defined networking (SDN) node.

FIG. 2 is a diagram of on embodiment of a hybrid software defined networking (SDN) node. In one embodiment, the process and system uses a horizontal split in the hybrid SDN node where a forwarding information base (FIB) manager correlates the configuration information elements provided by local and remote control plane processes and fills in the forwarding information base of the node based on the received configuration information. In this configuration, a service controller communicates with the node over a network connection. The node may be a switch or similar network device. The node includes the FIB manager and local control plane processes, which implement the distributed control plane processes. The FIB manager then uses the input of the service controller and the local control plane processes to update a packet forwarding function of the node. The FIB maintains a set of configuration information elements. The configuration information elements contain a next-hop identifier to allow their correlation and combination by the FIB manager. The next-hop identifier can be for example an internet protocol (IP) address, an identifier of a path in the network or a multiprotocol label switching (MPLS) label. The FIB can be structured as a hierarchical FIB (H-FIB) in some embodiments.

In other embodiments and implementations, a hybrid SDN can be implemented with what is referred to as vertical split. In this implementation, the node is configured to integrate and support a distributed legacy transport control plane and a central transport SDN functionality implemented by a services controller via a flow control protocol. In these embodiments and implementations, a flow control protocol may be extended for example by the use of virtual ports. These virtual ports can be used to facilitate interworking between a flow control switch and legacy transport in the form of local control plane processes. However, the prior art does not define how virtual ports should be used to implement interworking between legacy transport in the form of local control plane processes and SDN controlled transport via a services controller. Such interworking between the two control entities are essential in the case of a horizontal split hierarchical SDN; otherwise the centralized control plane will not able to detect the configuration changes conducted by the distributed legacy transport of the local control plane processes and cannot adapt to it.

In some embodiments, local control plane processes could use a flow control protocol such as the OpenFlow protocol to program the same logical switch instance as the services controller. Then the configuration information elements received from the two control entities (for example flow or group entries) are applied to the packets as placed in the flow control packet processing pipeline. To ensure the proper sequence of executing the configuration elements, the next-hop identifier may be encoded in the packet itself or associated with the packet as metadata. Encoding next-hop identifier (ID) as a packet field requires the node to re-parse the packet several times, which requires additional computational resources and in turn decreases the achievable throughput for the node.

Encoding the next-hop ID as metadata in a flow control protocol such as OpenFlow means using either a metadata field specified by the flow control protocol (e.g., OpenFlow protocol) or a flow control configuration element identifier, such as a group ID. However, these identifiers are up to 8 octets long; therefore, they cannot encode complex next-hop identifiers and the 8 octet long identifiers need to be mapped the complex next-hop descriptors. In such cases the services controller is not aware of the next-hop ID to flow control metadata value mapping and may obtain this mapping from the node-local control entity via a control channel. Furthermore, another lookup among configured metadata values is required. It may be also possible that the various control plane processes fill in different flow control tables of the same logical switch; however, this option results in that an address lookup will be performed multiple times. It results in wasting switch computational resources.

The local control plane processes may attach the next-hop ID to the port descriptors defined in a flow control configuration of a logical switch such as OF-CONFIG. However, OF-CONFIG allows configuring packet encapsulation when a logical switch port is bound to a physical device port: This mechanism is for implementing flow control overlays on top of tunnels, e.g., network virtualization using generic routing encapsulation (NVGRE) or virtual extensible local area network (VxLAN) but not for configuring additional forwarding steps. The embodiments of the invention set forth herein below overcome these limitations of the prior art.

The embodiments of the invention overcome these deficiencies in the prior art, by providing flow control protocol (e.g., OpenFlow) extensions and the corresponding FIB manager features needed to implement a hybrid SDN by using a flow control protocol between the network devices and the services controller. The FIB manager of a network device, which receives node reachability configuration elements from the local control plane processes (e.g. IGP) and which programs the packet forwarding function according to the received reachability configuration, configures several logical switches of the same network element by adding or removing reachability configuration elements as the local control plane process adds or removes configuration of how a remote network device is reachable from the executing network device. The embodiments provide advantages over the prior art of record. The embodiments offer programmable forwarding on the transport service layer in existing transport networks, enable simple roll out of transport SDN functionality, and simple hybrid SDN network device implementation.

Figure 3:
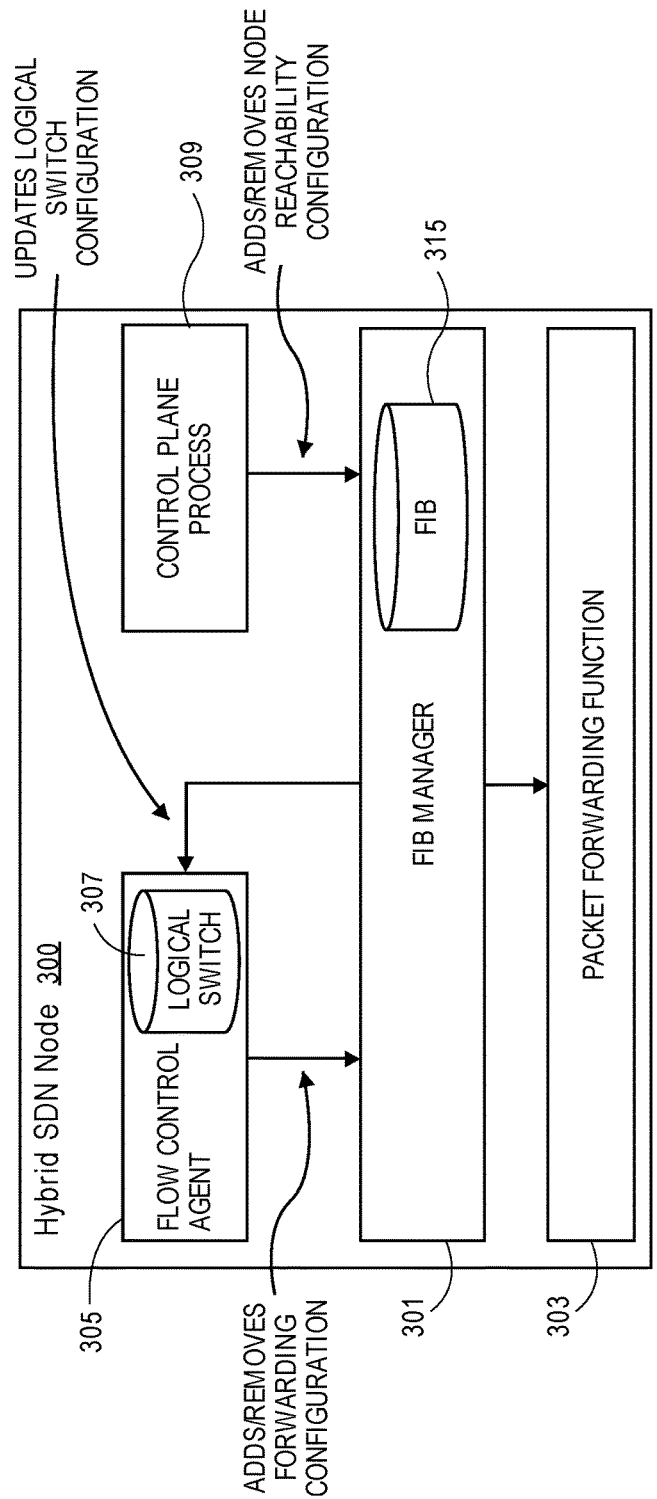
FIG. 3 is a diagram of one embodiment of a network device implemented as a hybrid SDN node.

FIG. 3 is a diagram of one embodiment of a network device implemented as a hybrid SDN node. The network device 300 executes the FIB manager 301, which receives node reachability configuration elements from local control plane processes 309 (e.g. IGP) and which programs the packet forwarding function 303 according to the received reachability configuration, maintains one or more logical switch models 307 per transport service according to the current state of the packet forwarding function 303. Specifically, the FIB manager 301 updates the logical switch models 307 based on FIB configuration instructions sent by the local control plane process 309. The logical switch models 307 are managed by a flow control agent 305, which communicates with the services controller, updates the logical switches 307 and sends add and remove commands to the forwarding configuration to the FIB manager 301.

Node reachability configuration elements describe all packet processing instructions required by the packet forwarding function 303 to forward a packet towards a referred node (e.g., the network domain egress node). Instructions are for example packet encapsulations, packet field updates, output physical port. Each node reachability configuration element contains a next-hop ID that identifies the referred switch.

The FIB manager 301 manages a FIB 315. The FIB manager 301 receives add and removal request for node reachability configuration elements from the control plane process 309 and receives add and removal forwarding configuration information from the flow control agent 305. The FIB 315 can be organized in any manner including as a hierarchical FIB (H-FIB). In return, when the FIB manager 301 updates the FIB 315 in response to adds and removals of node reachability configuration, then the FIB manager 301 sends an update request for the logical switch configuration to the flow control agent 305. The flow control agent 305 in turn updates the logical switches 307.

The packet forwarding function 303 is a function of the network device 300 that is responsible for processing incoming packets and determining how to forward them toward their next hop. The packet forwarding function 303 can be configured by FIB manager 301 at the direction of add and remove commands received from the flow control agent 305 or the control plane process 309.

Figure 4:
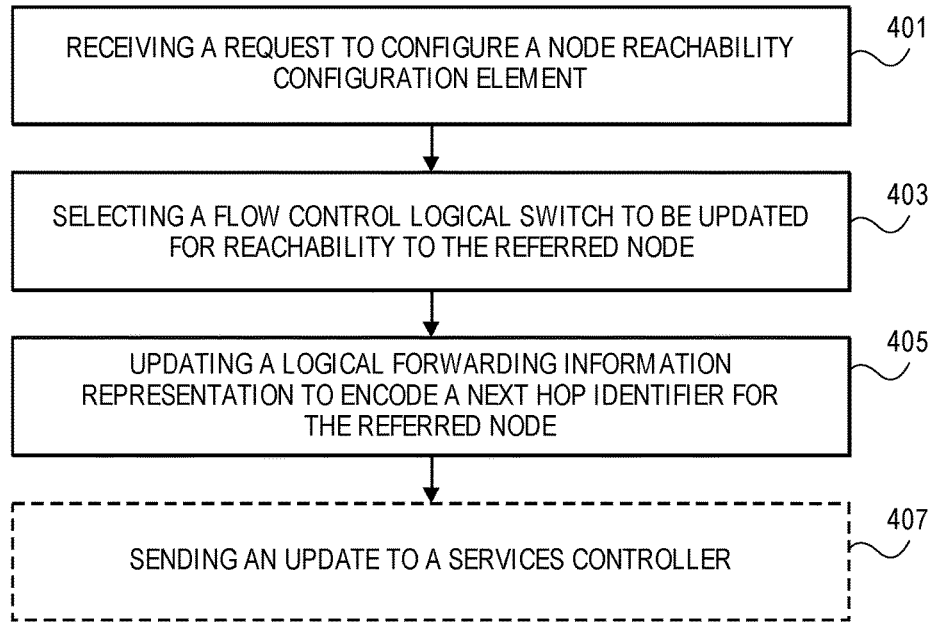
FIG. 4 is a flowchart of a general embodiment of the process of the FIB manager.

FIG. 4 is a flowchart of a general embodiment of the process of the FIB manager. The FIB manager handles both an addition of reachability configuration elements and the removal of reachability configuration elements. FIG. 4 is the process of adding the reachability configuration elements and the removal process is shown in FIG. 5.

The process may be initiated by the FIB manager receiving a request to configure a node reachability configuration element (Block 401). The request is received from the local control plane process or the flow control agent. The request specifies a node in the network to which new reachability information has been obtained. The FIB manager then selects all of the flow control logical switches to be updated for reachability to the node referred to in the request (Block 403). The logical forwarding information representation is updated to encode a next hop identifier for the referred node (Block 405). The updated information is then reported to the services controller so that it has a view of the current state of the network element (Block 407). Examples of the application of this process and the types of the logical forwarding information is presented herein below including one embodiment using logical port instances and another embodiment using group table entries.

Figure 5:
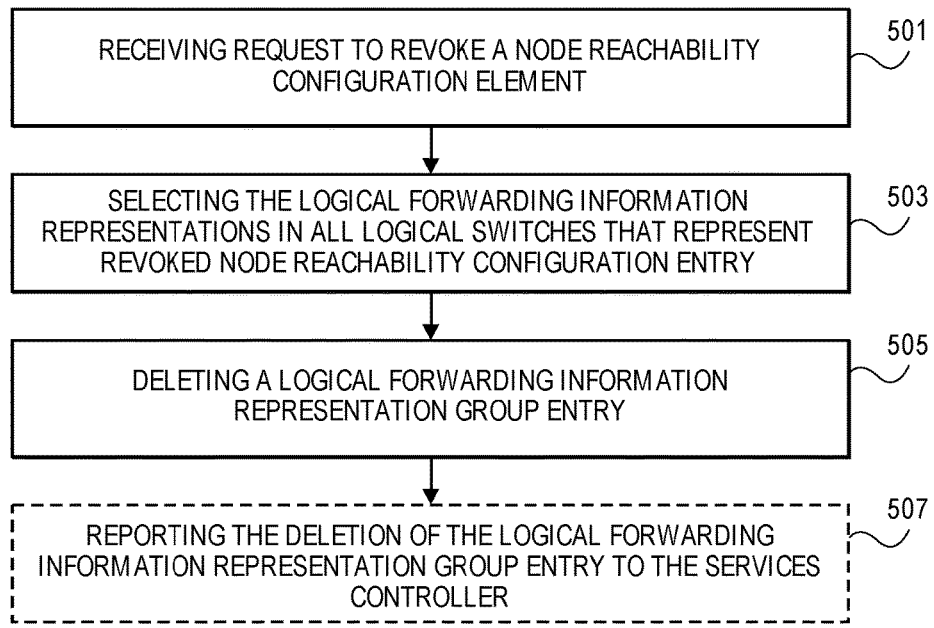
FIG. 5 is a flowchart of one embodiment of the process for removal of the reachability configuration elements in the FIB.

FIG. 5 is a flowchart of one embodiment of the process for removal of the reachability configuration elements in the FIB. The process may be initiated by the receipt at the FIB manager of a request to revoke a node reachability configuration element (Block 501). The request may be received from a local control plane process or a flow control agent. The FIB manager then selects the logical forwarding information representations in all logical switches that represent the revoked node reachability configuration entry (Block 503). The logical forwarding information representation may be a logical port instance or a group entry as described herein further below. The logical forwarding information representation can then be deleted or similarly updated to reflect that the correlated node reachability configuration has been revoked (Block 505). In one embodiment, the deletion or updated of the logical forwarding information representation can be reported to the services controller (Block 507).

The processes of the FIB manager described in relation to FIG. 4 and FIG. 5 are simplified and abstracted embodiments provided by way of illustration rather than limitation. One skilled in the art would understand that more specific implementations may vary in the mechanisms while remaining consistent with the processes and structures described. Two example implementations include a logical port based implementation and a group entry based implementation described herein below.

In one embodiment, the hybrid SDN network device is a logical port based implementation. In this embodiment of the invention, a flow control logical port, e.g., an OpenFlow logical port, represents exactly one node reachability configuration element. Given this representation, then the next-hop ID for reaching the corresponding node (i.e., the node to be reached as recorded in the FIB in the node reachability configuration element) is encoded as an attribute of the port data structure and is propagated to the service controller of the SDN network as a content of the standardized Port Status message. The port status shall be extended to define a new port property type code point in ofp_port_desc_prop_type (i.e., for an OpenFlow based implementation or a similar extension for other flow control protocols). A new data structure is also defined to carry the next-hop identifier.

In another embodiment of the invention, the logical port encodes the next-hop ID as the name of the port. This solution requires that either the length of the name field shall be increased from 16 or the protocol shall allow such encodings in the name fields that are not readable by a human (i.e., a non-human readable language is used such as a numerical encoding).

The rationale behind the above embodiments is that the service controller of the SDN network uses the next-hop IDs when it selects a next-hop for a certain service route. But for an OpenFlow implementation such as OpenFlow 1.5.0, the OpenFlow port identifier is 32 bits long and selected from a standard defined domain. Consequently, the service controller needs to be able to associate the next-hop ID with an OpenFlow logical port, e.g. based on the new port property or based on the extended port name.

On receipt of a flow control protocol flow rule or group entry that points at a logical port, the FIB manager looks up the node reachability information corresponding to the next-hop ID assigned to the logical port in the FIB and configures the packet forwarding function to forward matching packets based on the node reachability information (e.g. configuring an output port, encapsulations, and similar actions to be taken on a matching packet).

It is possible that more than one logical switch instance is configured, for example when multiple service controllers connect to the same network device. By default the FIB Manager creates a logical port instance in each logical switch instance when a new node becomes reachable. The FIB manager may be programmed to create logical ports only in a subset of logical switches. Therefore, the procedures described below support network devices where multiple logical switches are configured. The focus of these processes is the addition and removal of next hops from the FIB for a given node in the network.

In one embodiment, the process for adding a new next hop is triggered when a local control plane process configures a node reachability configuration element that is not yet translated. When a local control plane process configures a node reachability configuration element that is not yet translated into the packet forwarding function, the FIB Manager conducts the following steps besides updating the packet forwarding function. First, the FIB manager selects which of the logical switches are to be updated. This can be dependent on the types of services or similar characteristics associated with the logical switches.

Next, the FIB creates a new logical port instance in each selected logical switch instance and encodes the next-hop ID using any of the methods described herein. As a consequence of creating a logical port, the flow control agent will send a Port Status message to corresponding service controllers indicating the creation of the new logical port. This behavior may be consistent with some flow control protocols such as OpenFlow. In other embodiments, other types of notifications can be sent to the services controller to provide it with this updated configuration information so that it will be aware of the configuration of the hybrid SDN network device, which would affect further.

Procedures upon deleting a next hop may be implemented after a node reachability configuration entity is revoked. In this case the FIB Manager conducts the following steps besides updating the packet forwarding function. First the FIB manager selects the logical port instances in all flow control agents that represent the revoked node reachability configuration entity. Then the FIB manager deletes all identified flow control logical ports from the proper logical switches. Along with deleting the logical port, the FIB Manager deletes all flow, group and meter entries that become invalid as a result of deleting the logical port. As a consequence of the above steps, the flow control agent sends a port status message and several flow modification messages to the services controller indicating the removal of the logical ports and of the flow entries. A node reachability configuration entity can be revoked by either the node local control plane entity that configured it previously, or the FIB Manager can declare it invalid as a result of status update of the packet forwarding function.

A second implementation having a distinct process and structure from the above logical port based implementation is a group entry based implementation. In the group entry based embodiment of the invention, a flow control group entry represents one node reachability configuration element. The creation, the removal or any update of such a group entry is propagated to the services controller by using the request forward message or similar message of flow control protocol such as OpenFlow 1.5.0 that carries a group mod message specifying the creation, the removal or the update of the group entry.

The group entry representing a node reachability configuration element can be an indirect group entry referring to a reserved logical port that carries the next-hop ID as an attribute. In one implementation, the next-hop ID is encoded in a new action included into the sole bucket of the indirect group entry. On receipt of a flow control protocol flow rule or group entry that points at a group entry with a reference to a next-hop ID, the FIB manager looks up the node reachability information corresponding to the next-hop ID in the FIB and configures the FIB to forward matching packets based on the node reachability information (e.g. by configuring output port, encapsulations, and similar information in the entry). It is possible that more than one logical switch instances are configured, for example when multiple service controllers connect to the same network device. By default the FIB Manager creates a group entry in each logical switch instance when a new node becomes reachable. The FIB manager may be programmed to create group entries only in a subset of logical switches. Therefore, the procedures described below supports network devices where multiple logical switches are configured.

In one embodiment, the processes related to the function of the FIB manager are focused on the procedures for creating a next-hop. When a control plane process configures a node reachability configuration element that is not translated into the packet forwarding function, the FIB Manager conducts the following steps besides updating the packet forwarding function. First the FIB manager selects which of the logical switches is to be updated. The logical switches to be updated can be based on parameters thereof or on extrinsic information specified by a services controller. The FIB manger creates a new group entry in each selected the OpenFlow agent and encodes the next-hop ID. Procedures upon deleting a next-hop are performed in response to a change in node reachability configuration.

After a node reachability configuration entity is revoked, the FIB Manager conducts the following steps besides updating the packet forwarding function. First, the FIB manager selects the group entries in all logical switches that represent the revoked node reachability configuration entity. Then the FIB manager deletes all identified group entries from the proper flow control agent. A node reachability configuration entity can be revoked by either the control plane process that configured it previously, or the FIB manager declares it invalid as a result of status update of the packet forwarding function.

The FIB Manager maintains a flow control logical switch instance in accordance with the current configuration of the packet forwarding function. The FIB manager uses the logical ports to describe current configuration of the packet forwarding function. The FIB manager uses the group entries to describe current configuration of the packet forwarding function.

Figure 6:
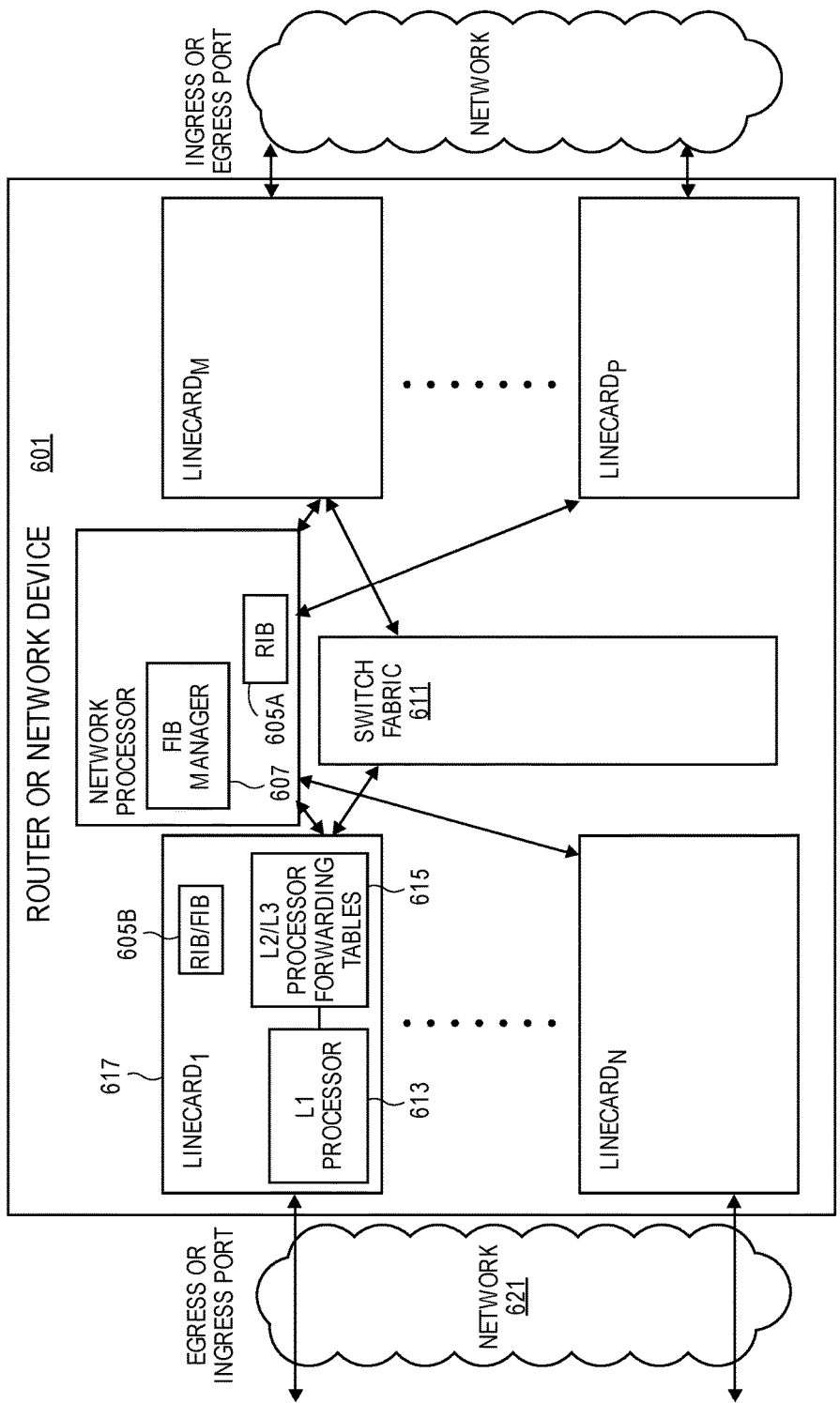
FIG. 6 is a diagram of one embodiment of the network device.

FIG. 6 is a diagram of one embodiment of the network device. In one embodiment, a network device 601 is implemented as a hybrid SDN network device or similar computing device. The network device 601 can have any structure that enables it to receive data traffic (e.g., multicast data traffic) and forward it toward its destination. The network device 601 can include a network processor 603 or set of network processors that execute the functions of the network device 601. A 'set,' as used herein, is any positive whole number of items including one item. The network device 601 can execute FIB manager 607 to implement the functions of configuring the network for proper handling of quick change IP channels forwarding of data packets across networks where the network device 601 functions as a node in this network as described herein above via a network processor 603.

The network device 601 connects with separately administered networks that have user equipment and/or content servers. The network processor 603 can implement the FIB manager 607 as a discrete hardware, software module or any combination thereof. The network processor 603 can also service the routing information base 605A and similar functions related to data traffic forwarding and network topology maintenance. The routing information base 605A can be implemented as match action tables that are utilized for forwarding protocol data units PDUs (i.e. packets). The functions of FIB manager 607 can be implemented as modules in any combination of software, including firmware, and hardware within the network device. The functions of the FIB manager 607 that are executed and implemented by the network device 601 include those described further herein above.

In one embodiment, the network device 601 can include a set of line cards 617 that process and forward the incoming data traffic toward the respective destination nodes by identifying the destination and forwarding the data traffic to the appropriate line card 617 having an egress port that leads to or toward the destination via a next hop. These line cards 617 can also implement the forwarding information base and label forwarding base 605B, or a relevant subset thereof. The line cards 617 can also implement or facilitate the FIB manager 607 functions described herein above. The line cards 617 are in communication with one another via a switch fabric 611 and communicate with other nodes over attached networks 621 using Ethernet, fiber optic or similar communication links and media.

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 700A, E, and F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application-specific integrated-circuits (ASICs) and a proprietary operating system (OS); and 2) a general purpose network device 704 that uses common off-the-shelf (COTS) processors and a standard OS.

The special-purpose network device 702 includes networking hardware 710 comprising compute resource(s) 712 (which typically include a set of one or more processors), forwarding resource(s) 714 (which typically include one or more ASICs and/or network processors), and physical network interfaces (NIs) 716 (sometimes called physical ports), as well as non-transitory machine readable storage media 718 having stored therein networking software 720. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 700A-H. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 760A-R. Each of the virtual network element(s) (VNEs) 760A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

Software 720 can include code which when executed by networking hardware 710, causes networking hardware 710 to perform operations of one or more embodiments of the present invention as part networking software instances 722 such as the FIB manager 764 described herein.

The special-purpose network device 702 is often physically and/or logically considered to include: 1) a ND control plane 724 (sometimes referred to as a control plane) comprising the compute resource(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the compute resource(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein software 750. During operation, the processor(s) 742 execute the software 750 to instantiate one or more sets of one or more applications 764A-R. While one embodiment does not implement virtualization, alternative embodiments may use different forms of virtualization—represented by a virtualization layer 754 and software containers 762A-R. For example, one such alternative embodiment implements operating system-level virtualization, in which case the virtualization layer 754 represents the kernel of an operating system (or a shim executing on a base operating system) that allows for the creation of multiple software containers 762A-R that may each be used to execute one of the sets of applications 764A-R. In this embodiment, the multiple software containers 762A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 754 represents a hypervisor (sometimes referred to as a virtual machine monitor (VMM)) or a hypervisor executing on top of a host operating system; and 2) the software containers 762A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications (e.g., FIB manager) 764A-R, as well as the virtualization layer 754 and software containers 762A-R if implemented, are collectively referred to as software instance(s) 752. Each set of applications 764A-R, corresponding software container 762A-R if implemented, and that part of the hardware 740 that executes them (be it hardware dedicated to that execution and/or time slices of hardware temporally shared by software containers 762A-R), forms a separate virtual network element(s) 760A-R.

The virtual network element(s) 760A-R perform similar functionality to the virtual network element(s) 730A-R—e.g., similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 762A-R differently. For example, while embodiments of the invention are illustrated with each software container 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 762A-R to VNEs also apply to embodiments where such a finer level of granularity is used.

In certain embodiments, the virtualization layer 754 includes a virtual switch that provides similar forwarding services as a physical Ethernet switch. Specifically, this virtual switch forwards traffic between software containers 762A-R and the NIC(s) 744, as well as optionally between the software containers 762A-R; in addition, this virtual switch may enforce network isolation between the VNEs 760A-R that by policy are not permitted to communicate with each other (e.g., by honoring virtual local area networks (VLANs)).

Software 750 can include code which when executed by processor(s) 742, cause processor(s) 742 to perform operations of one or more embodiments of the present invention as part of software containers 762A-R, specifically the execution of a FIB manager 764A-R or similar elements of the embodiments.

The third exemplary ND implementation in FIG. 7A is a hybrid network device 706, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

Figure 7C:
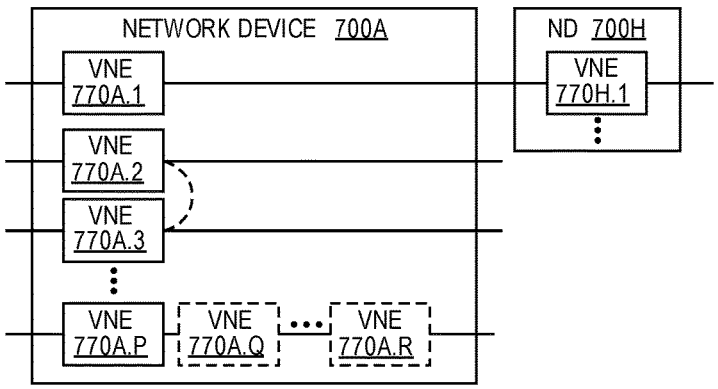
FIG. 7C illustrates various exemplary ways in which virtual network elements (VNEs) may be coupled according to some embodiments of the invention.

FIG. 7C illustrates various exemplary ways in which VNEs may be coupled according to some embodiments of the invention. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service—e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the software containers 762A-R may operate as servers; the same would be true for the hybrid network device 706; in the case of the special-purpose network device 702, one or more such servers could also be run on a virtualization layer executed by the compute resource(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 7D:
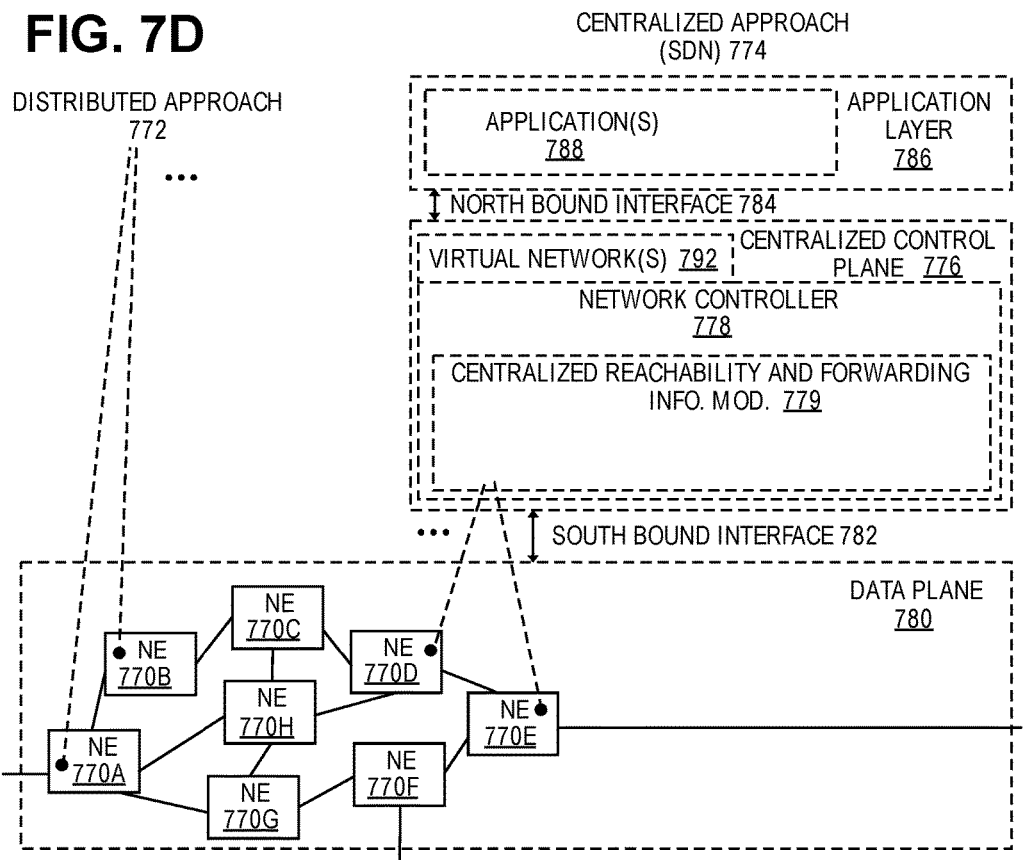
FIG. 7D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 7D illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments of the invention. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP)), Label Distribution Protocol (LDP), Resource Reservation Protocol (RSVP), as well as RSVP-Traffic Engineering (TE): Extensions to RSVP for LSP Tunnels, Generalized Multi-Protocol Label Switching (GMPLS) Signaling RSVP-TE that communicate with other NEs to exchange routes, and then selects those routes based on one or more routing metrics. Thus, the NEs 770A-H (e.g., the compute resource(s) 712 executing the control communication and configuration module(s) 732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach 772 can be implemented on the general purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). Thus, the network intelligence is centralized in the centralized control plane 776 executing on electronic devices that are typically separate from the NDs.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the compute resource(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D shows the distributed approach 772 separate from the centralized approach 774, the effort of network control may be distributed differently or the two combined in certain embodiments of the invention. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 774, but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

Figure 7E:
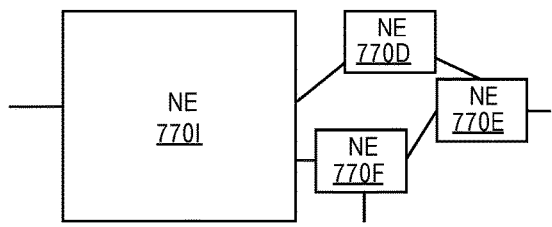
FIG. 7E illustrates the simple case of where each of the NDs implements a single NE, but a centralized control plane has abstracted multiple of the NEs in different NDs into (to represent) a single NE in one of the virtual network(s), according to some embodiments of the invention.
Figure 7F:
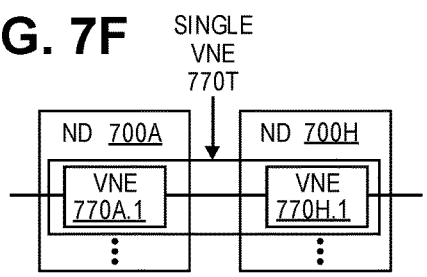
FIG. 7F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 7701 in one of the virtual network(s) 792 of FIG. 7D, according to some embodiments of the invention. FIG. 7E shows that in this virtual network, the NE 770T is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
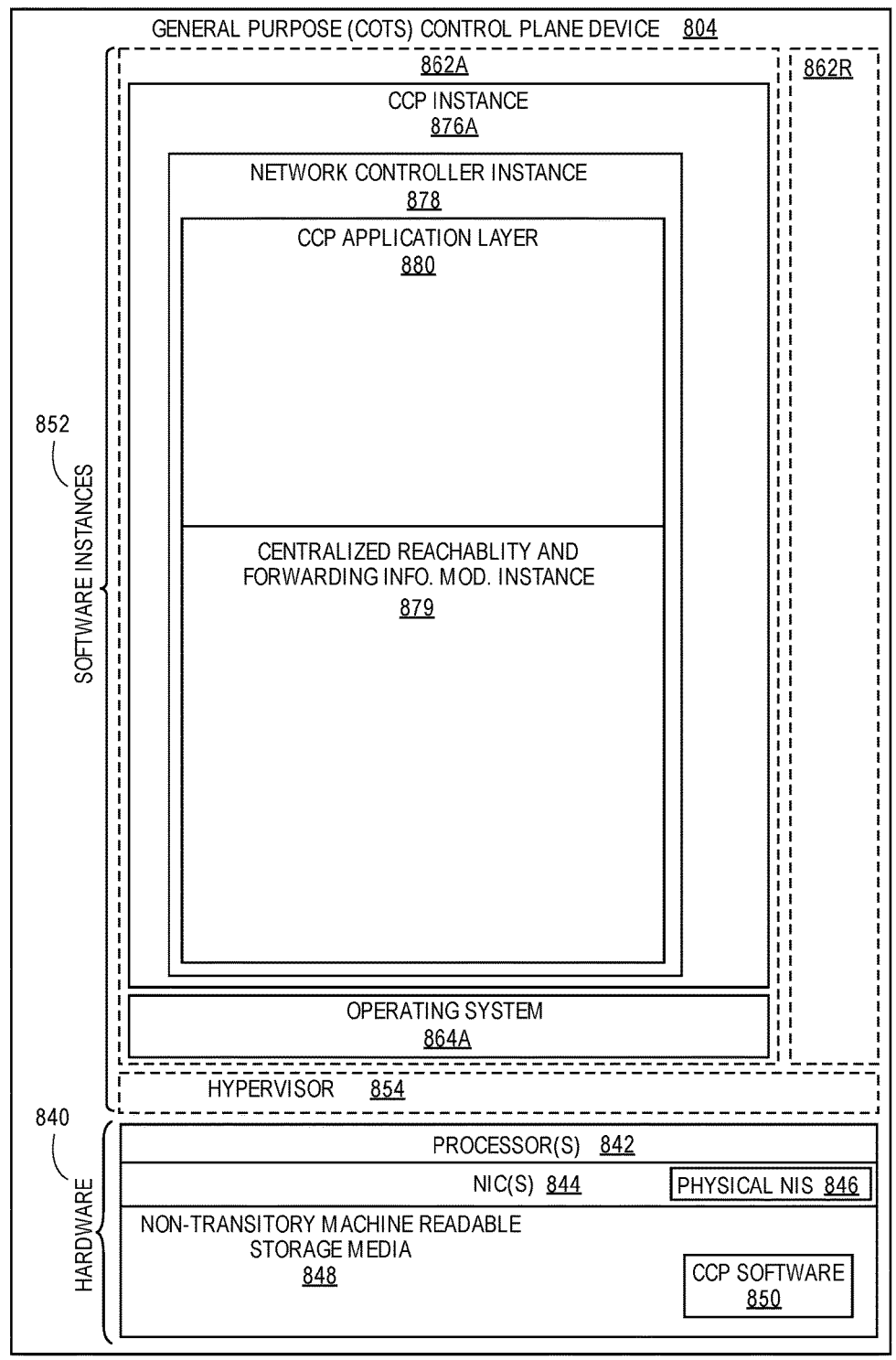
FIG. 8 illustrates a general purpose control plane device with centralized control plane (CCP) software, according to some embodiments of the invention.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 8 illustrates, a general purpose control plane device 804 including hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein centralized control plane (CCP) software 850.

In embodiments that use compute virtualization, the processor(s) 842 typically execute software to instantiate a virtualization layer 854 and software container(s) 862A-R (e.g., with operating system-level virtualization, the virtualization layer 854 represents the kernel of an operating system (or a shim executing on a base operating system) that allows for the creation of multiple software containers 862A-R (representing separate user space instances and also called virtualization engines, virtual private servers, or jails) that may each be used to execute a set of one or more applications; with full virtualization, the virtualization layer 854 represents a hypervisor (sometimes referred to as a virtual machine monitor (VMM)) or a hypervisor executing on top of a host operating system, and the software containers 862A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 850 (illustrated as CCP instance 876A) is executed within the software container 862A on the virtualization layer 854. In embodiments where compute virtualization is not used, the CCP instance 876A on top of a host operating system is executed on the "bare metal" general purpose control plane device 804. The instantiation of the CCP instance 876A, as well as the virtualization layer 854 and software containers 862A-R if implemented, are collectively referred to as software instance(s) 852.

In some embodiments, the CCP instance 876A includes a network controller instance 878. The network controller instance 878 includes a centralized reachability and forwarding information module instance 879 (which is a middleware layer providing the context of the network controller 778 to the operating system and communicating with the various NEs), and an CCP application layer 880 (sometimes referred to as an application layer) over the middleware layer (providing the intelligence required for various network operations such as protocols, network situational awareness, and user-interfaces). At a more abstract level, this CCP application layer 880 within the centralized control plane 776 works with virtual network view(s) (logical view(s) of the network) and the middleware layer provides the conversion from the virtual networks to the physical view.

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method implemented by a network element to execute a forwarding information base (FIB) manager to manage an FIB of the network element and to program a packet forwarding function of the network element, where the FIB manager supports a hybrid control plane with software defined networking (SDN) and local control plane processes, the method comprising:
   receiving a request to configure a node reachability configuration element, where the node reachability configuration element describes a packet processing instruction for the packet forwarding function to forward packets toward a referred node;
   selecting a flow control agent from a set of flow control agents that each manage a separate flow control logical switch instance, the flow control agent to update reachability information to the referred node for an associated flow control logical switch instance, each separate flow control logical switch instance being a data plane implementation of a logical view of the FIB and each separate flow control logical switch having a separate service controller; and
   updating a logical forwarding information representation to encode a next hop identifier for the referred node.

2. The method of claim 1, wherein the logical forwarding information representation is a logical port instance.

3. The method of claim 2, further comprising:
   sending a flow control port status message to a services controller for the associated logical switch instance identifying the logical port instance.

4. The method of claim 2, further comprising:
   sending an update to the services controller identifying the flow control group entry.

5. The method of claim 2, wherein in response to the node reachability configuration element being revoked, further comprising:

deleting the logical port instance from the associated flow control logical switch instance.

6. The method of claim 1, wherein the logical forwarding information representation is a flow control group entry.

7. The method of claim 6, wherein in response to the node reachability configuration element being revoked, further comprising:
deleting the flow control group entry from the associated flow control logical switch instance.

8. A network element configured to execute a forwarding information base (FIB) manager to manage an FIB and to program a packet forwarding function of the network element, where the FIB manager supports a hybrid control plane with software defined networking (SDN) and local control plane processes, the network element comprising:
a non-transitory machine readable medium having stored therein the FIB and the FIB manager; and
a processor coupled to the non-transitory machine readable medium, the processor configured to execute the FIB manager, the FIB manager configured to receive a request to configure a node reachability configuration element, where the node reachability configuration element describes packet processing instruction for the packet forwarding function to forward packets toward a referred node, to select a flow control agent from a set of flow control agents that each manage a separate flow control logical switch instance, the flow control agent to update reachability information to the referred node for an associated flow control logical switch instance, each separate flow control logical switch instance being a data plane implementation of a logical view of the FIB and each separate flow control logical switch having a separate service controller, and to update a logical forwarding information representation to encode next hop identifier for the referred node.

9. The network element of claim 8, wherein the logical forwarding information representation is a logical port instance.

10. The network element of claim 8, wherein the associated flow control logical switch instance is configured to send a flow control port status message to a services controller identifying the logical port instance.

11. The network element of claim 9, wherein the associated flow control logical switch instance is configured to send an update to the services controller for the associated logical switch instance when a group entry is added or deleted.

12. The network element of claim 9, wherein in response to the node reachability configuration element being revoked, the FIB manager is further configured to delete the logical port instance from an associated flow control logical switch instance.

13. The network element of claim 8, wherein the logical forwarding information representation is a flow control group entry.

14. The network element of claim 13, wherein in response to the node reachability configuration element being revoked, the FIB manager is further configured to delete the flow control group entry from a flow control logical switch instance.

15. A computing device configured to execute a plurality of virtual machines for implementing network function virtualization (NFV), wherein a virtual machine from the plurality of virtual machines for is configured to execute a forwarding information base (FIB) manager to manage an FIB of a network element and to program a packet forwarding function of the network element, where the FIB manager supports a hybrid control plane with software defined networking (SDN) and local control plane processes, the computing device comprising:
a non-transitory machine readable medium having stored therein the FIB manager; and
a processor coupled to the non-transitory machine readable medium, the processor configured to execute the virtual machine, the virtual machine configured to execute the FIB manager, the FIB manager configured to receive a request to configure a node reachability configuration element, where the node reachability configuration element describes packet processing instruction for the packet forwarding function to forward packets toward a referred node, to select a flow control agent from a set of flow control agents that each manage a separate flow control logical switch instance, the flow control agent to update reachability information to the referred node for an associated flow control logical switch instance, each separate flow control logical switch instance being a data plane implementation of a logical view of the FIB and each separate flow control logical switch having a separate service controller, and to update a logical forwarding information representation to encode next hop identifier for the referred node.

16. The computing device of claim 15, wherein the logical forwarding information representation is a logical port instance.

17. The computing device of claim 15, wherein the associated flow control logical switch instance is configured to send a flow control port status message to a services controller for the associated logical switch instance identifying the logical port instance.

18. The computing device of claim 15, wherein in response to the node reachability configuration element being revoked, the FIB manager is further configured to delete the logical port instance from the associated flow control logical switch instance.

19. The computing device of claim 15, wherein the logical forwarding information representation is a flow control group entry.

20. The computing device of claim 19, wherein in response to the node reachability configuration element being revoked, the FIB manager is further configured to delete the flow control group entry from the associated flow control logical switch instance.

* * * * *